United States Patent [19]

Chandler et al.

[11] Patent Number: 4,644,699

[45] Date of Patent: Feb. 24, 1987

[54] TRANSPARENT JEEP TYPE VEHICLE DOOR

[76] Inventors: Kenneth E. Chandler, 1444 S. Yampa Ct., Aurora, Colo. 80017; Loren K. Wolfe, 14026 E. 22nd Pl., Aurora, Colo. 80011

[21] Appl. No.: 616,013

[22] Filed: May 31, 1984

[51] Int. Cl.$^4$ .............................................. B60J 5/04
[52] U.S. Cl. ...................................... 49/502; 49/501; 296/146; 296/148; 296/190
[58] Field of Search .................... 49/501, 502, 413; 296/146, 147, 148, 151, 190

[56] References Cited

U.S. PATENT DOCUMENTS 3,377,748 4/1968 Kellerhaus ........................... 49/9 X
4,070,056 1/1978 Hickman ........................... 49/501 X

FOREIGN PATENT DOCUMENTS 887498 1/1962 United Kingdom .................. 49/413

*Primary Examiner*—Kenneth Downey
*Attorney, Agent, or Firm*—Max L. Wymore

[57] ABSTRACT

The construction according to the invention is applied to a utility vehicle such as an open vehicle having an open top such as a Jeep type vehicle or a large earth moving machine. To provide an enclosed operator's compartment it has been necessary to use steel or fabric door closures. The present invention makes use of space age plastics and uses the high impact characteristics along with the transparency of these materials to provide a strong yet safe door closing allowing the operator to have full vision from the door of the operator's station.

5 Claims, 8 Drawing Figures

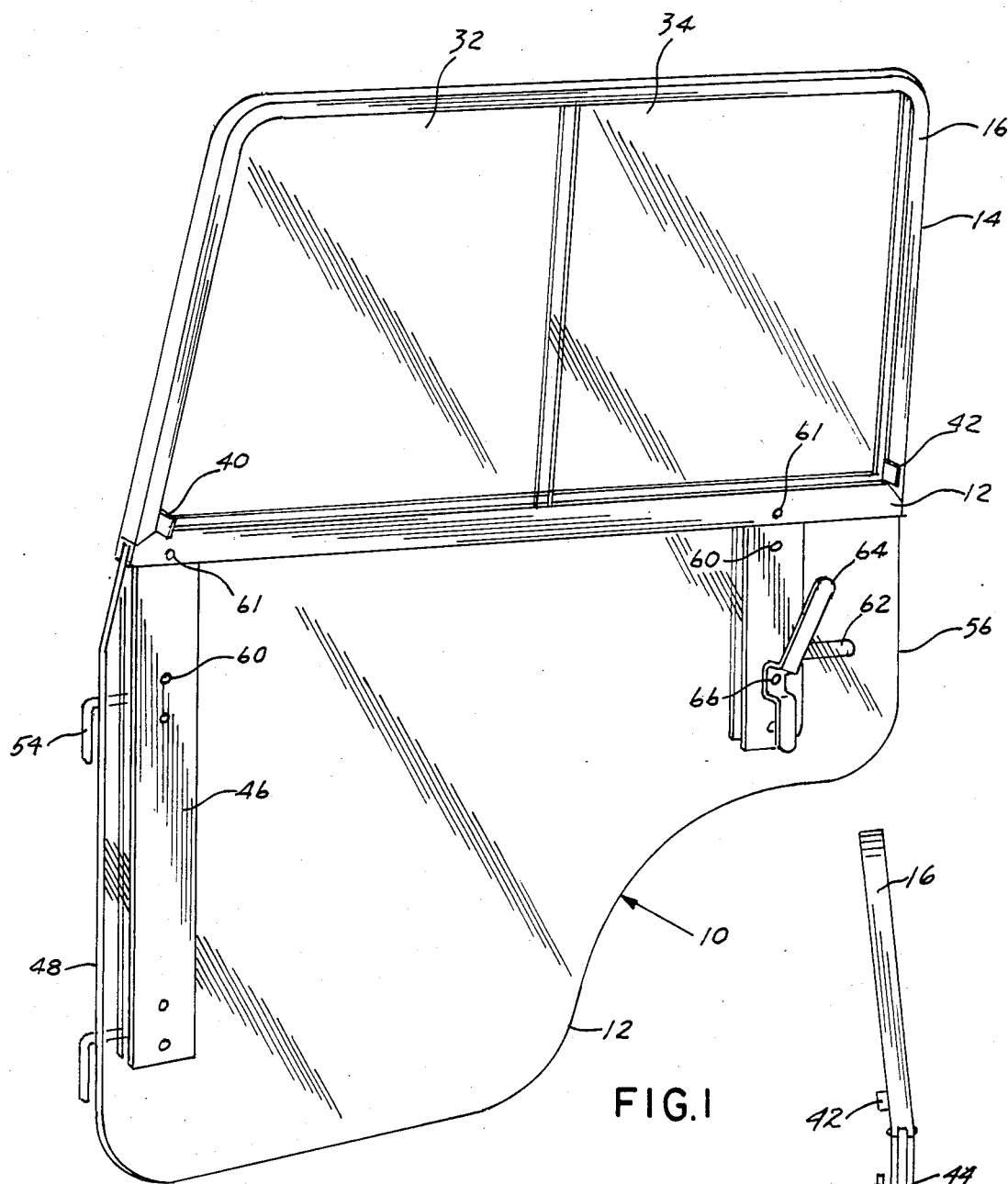
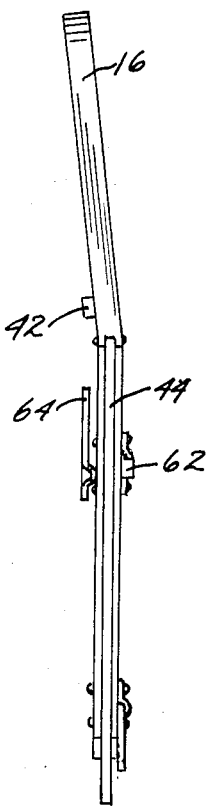
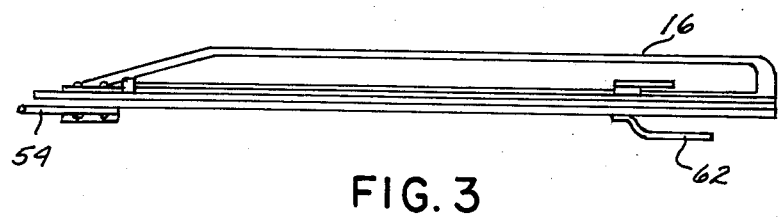
FIG. 1
FIG. 3
FIG. 2

006E
TRANSPARENT JEEP TYPE VEHICLE DOOR

BACKGROUND OF THE INVENTION

This invention is directed to the field of doors to be used on vehicles and a door of the type used on Jeep type vehicles as well as any truck type vehicle having an open body arrangement even extending to large earth moving machines and the like. Such vehicles may have a top or not which may be a fabric top or a molded top.

The fabric or "soft" doors are usually made with a metal frame to establish the shape which usually fit the door opening to provide a good weather seal. Also in most cases the door is opaque except for a flexible window in the upper part of the door which is fixed and may or may not be opened. Some prior art doors are of metal and include sliding windows in the top portion of the door. Some other Jeep type doors are provided with a transparent window as well in the lower portion of the door but due to the large frame required to support the glass or transparent portion, the operator's view out the lower portion, when the door is closed is almost completely obstructed.

SUMMARY OF THE INVENTION

The present invention overcomes the problems mentioned above and provides a door that is simple and relatively inexpensive. The door according to this invention also may be mounted on the existing hinges to simplify installation and removal.

The door of the present invention comprises an upper portion with two horizontal sliding transparent panels attached to the top of a lower panel that is entirely transparent such that the door of this invention, in contrast to prior art doors, permits full vision by the operator through the transparent door. The transparent material used in the door according to the invention is a space age development and is relatively lightweight while being very strong and shatterproof. The light weight permits use of the door with the existing hinge and hardware.

BRIEF DESCRIPTION OF THE DRAWINGS

Other advantages and features of novelty will become apparent as the description proceeds by reference to the accompanying drawings in which:

FIG. 1 is a perspective view of the door of the invention;

FIG. 2 is front elevational view of the door of the invention;

FIG. 3 is a top plan view of the door of the invention;

DESCRIPTION OF THE PREFERRED EMBODIMENT

The door 10 of the invention is illustrated in FIG. 1 in perspective as seen from the interior of the vehicle on which this illustrated door is mounted on the right or opposite the operator's side of the vehicle. The door is provided with a lower panel 12 entirely of transparent plastic such as a polycarbonate plastic sheet which is a product of General Electric Company of Pittstown, Massachusetts.

Figure 7:
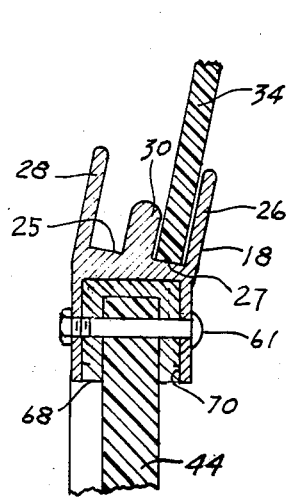
FIG. 7 is a fragmentary side elevational cross section view of the door of the invention along line 7—7 of FIG. 6; and, FIG. 8 is a fragmentary side elevational cross section view of the door of the invention along line 8—8 of FIG. 5.
Figure 8:
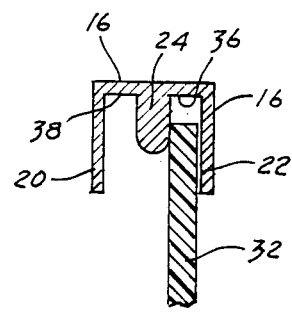
Figure 5:
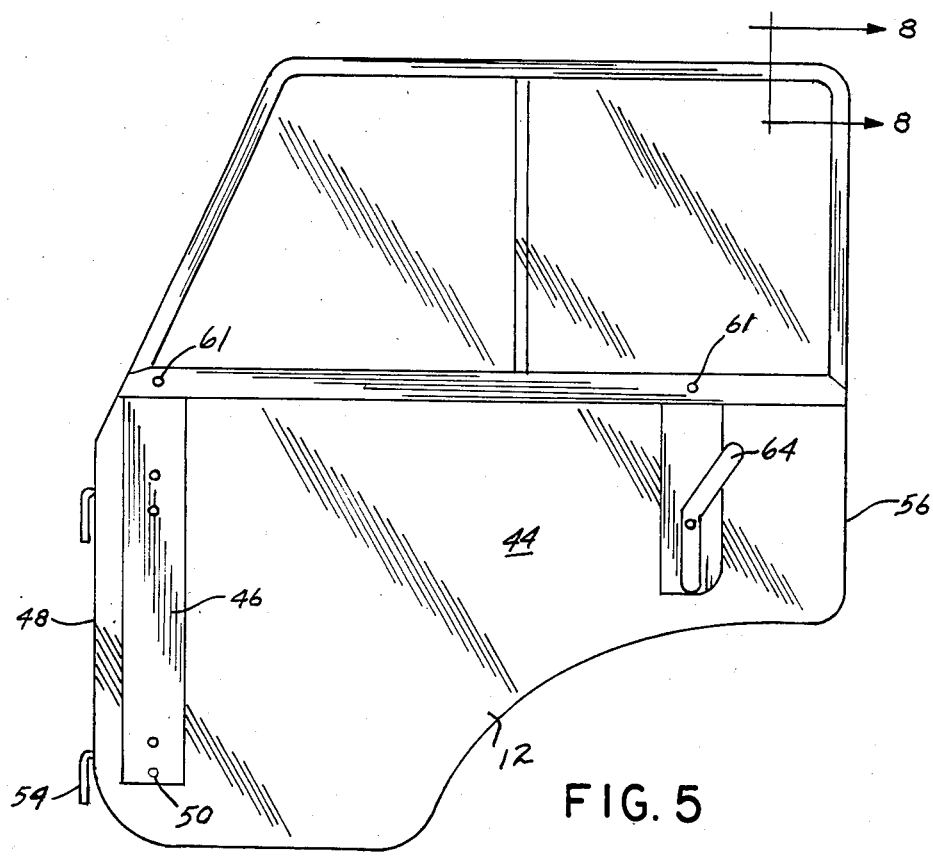
FIG. 5 is an outer side elevational view of the door of the invention.
Figure 6:
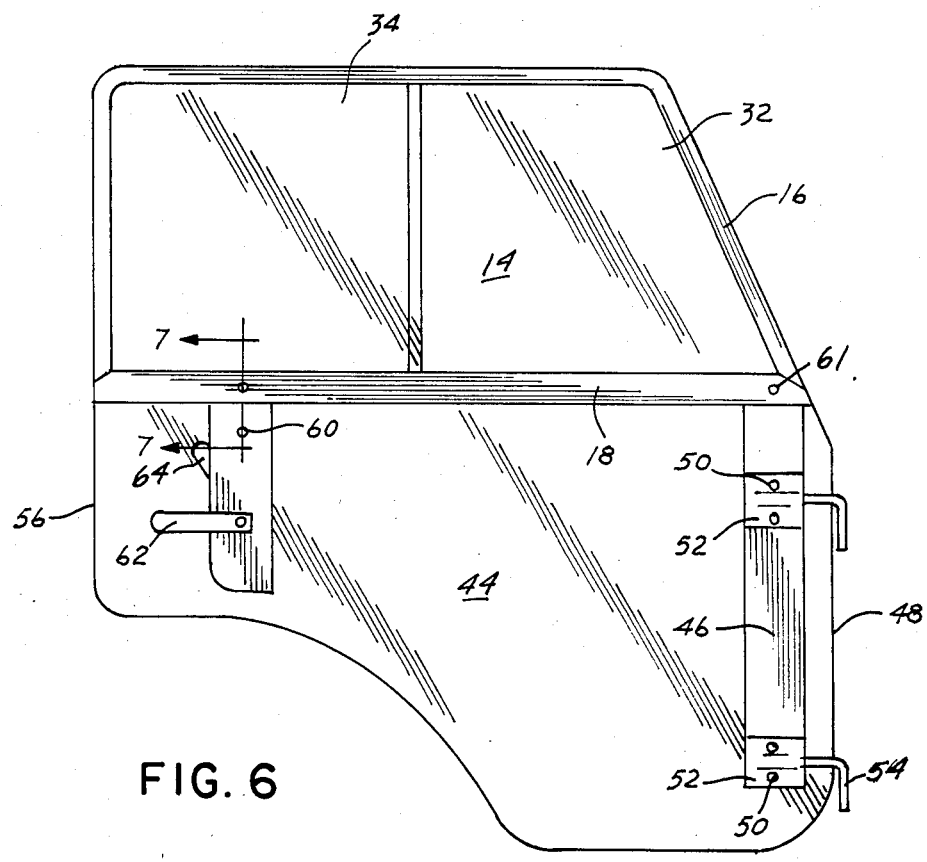
FIG. 6 is an inner side elevational view of the door of the invention.

The door 10 is provided with a lower door portion 12 and an upper window portion 14 which is comprised of an inverted U-shaped metal frame 16 made of aluminum or the like and having an M cross section as best seen in FIG. 8. A straight horizontal member 18 having an H cross section, as seen in FIG. 7, is fastened to the free ends of the legs of the U-shaped frame 16 as by welding and the like. The U-shaped frame 16 has an M cross section with outer ribs 20 and 22 and a center rib 24 while the upper portion of H channel member 18 is provided with outer ribs 26 and 28 and an intermediate rib 30. The slidable plastic panes 32 and 34 are positioned within the tracks 36 and 38 formed between legs 20, 22 and 24 of frame 16 and within the tracks 25 and 27 formed between legs 26, 28, and 30 of frame 18 to slidably overlap and are provided with a handle 40 and 42 on each pane, respectively, as means for slidably moving one pane with respect to the other.

The lower door portion is provided with a lower pane 44 of transparent plastic, such as polycarbonate, which is provided and shaped to close either door opening of an open cab vehicle to provide a see-through safety door which is stronger than canvas, lighter than steel and is transparent. The superior impact strength of polycarbonate has been used in the construction of bulletproof security windows and to protect stained glass windows. It will withstand over 10,000 pounds of pressure per square inch.

A pair of vertically positioned metal straps 46 are positioned adjacent the forward edge 48 of the door with the door plastic 44 sandwiched therebetween. The straps 46 are secured to the plastic 44 of the door by means of bolts 50 and a keeper member 52 straddles a pair of L-shaped hinge members 54 which are known to mate with the standard hinge members on most Jeep type vehicles. Toward the rearward edge 56 of the door, another pair of vertical straps 58 are positioned adjacent thereto with the plastic 44 being sandwiched therebetween and secured by bolts 60. An outside handle 62 and an inside handle 64 are connected together by a shaft 66 which passes through straps 58 and plastic 44. The inside handle coacts with the inside of the door opening of a vehicle to secure and lock the door closed.

Figure 4:
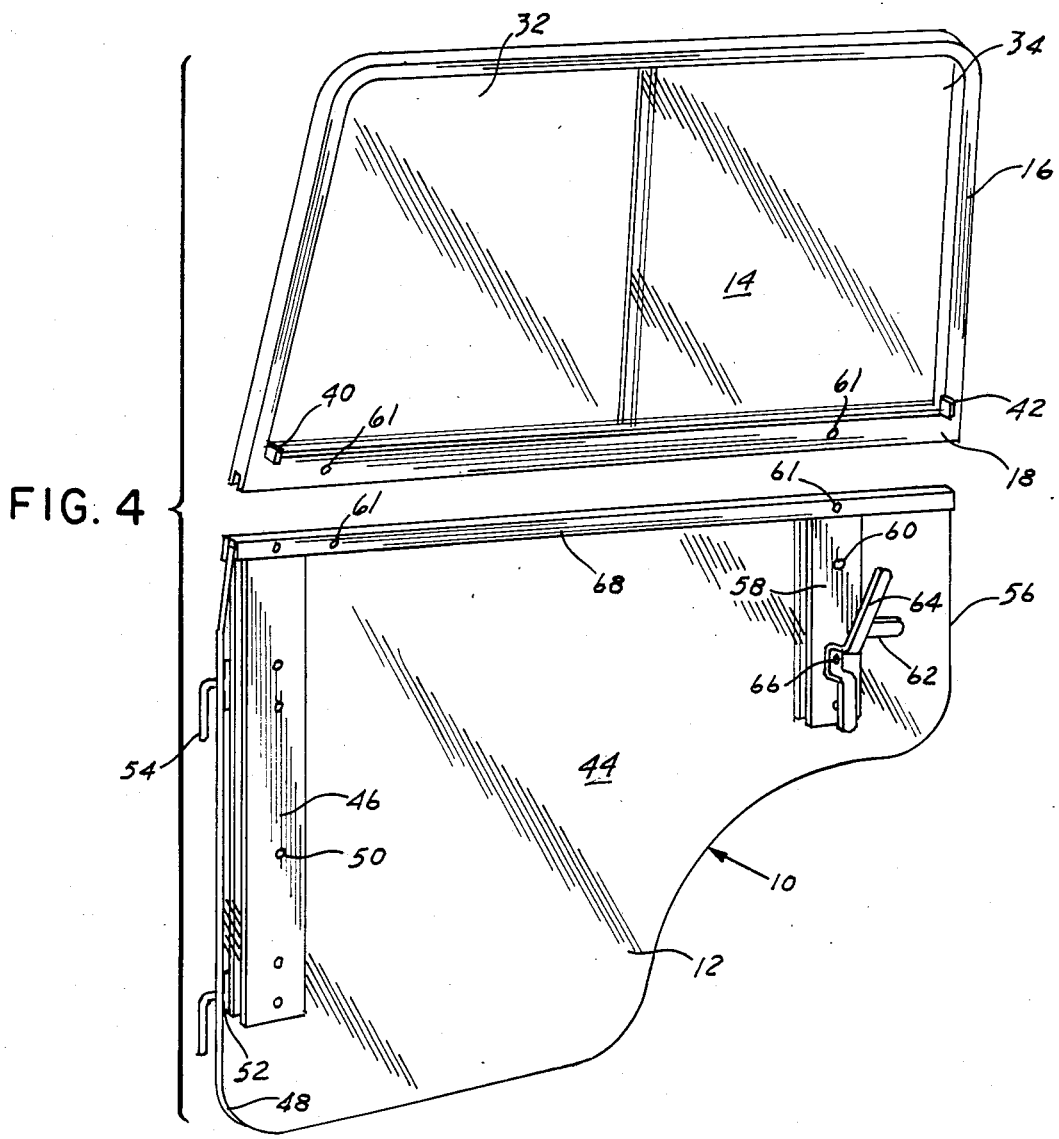
FIG. 4 is a perspective exploded view of the door of the invention in elevation.

A straight horizontal member 68, FIG. 4, is secured to the top of the plastic door 44 by means of two bolts 61 which also removably secure the window portion 14 to the lower door portion 44. The lower portion of horizontal H-shaped member 18 is provided with a horizontal channel 70 sized to receive the horizontal member 68 in telescoping or tongue-in-groove fashion. The bolts 61 are provided with removable nuts to permit removal of the bolts and separation of the window portion 14 from the door portion 44. The horizontal member 68 is secured to the plastic 12 by means of bolts 61.

While there has been described what at present is considered to be the preferred embodiment of the invention, it will be obvious to those skilled in the art that various changes and modifications may be made therein without departing from the invention. It is aimed therefore, in the appended claims to cover all such changes and modifications which fall within the true spirit and scope of the invention.

What is claimed is:

1. A combination safety window and door for use on open cab vehicles which comprises:
   an upper portion having a transparent window portion; and,
   a lower door portion sized and shaped to provide a door closure means wherein the lower portion is devoid of a frame about the lower extremities which lower extremities are completely and entirely transparent.

2. The combination of claim 1 wherein the window portion includes a pair of slide-past transparent window portions of a high impact transparent plastic.

3. The combination of claim 1 wherein the window portion comprises a frame means surrounding the window portion, which frame means includes a pair of side-by-side grooves adapted to and receiving a pair of panes of a high impact transparent plastic in slide-past relation.

4. The combination of claim 1 wherein the upper window portion is provided with a frame means having a downwardly opening groove adapted to receive and removably receiving the upper edge of the lower door portion in tongue-and-groove fashion.

5. The combination of claim 3 wherein the upper window portion is provided with a frame means having a downwardly opening groove adapted to receive and removably receiving the upper edge of the lower door portion in tongue-and-groove fashion.

* * * * *